US009684505B2

(12) United States Patent
Kaneki et al.

(10) Patent No.: US 9,684,505 B2
(45) Date of Patent: Jun. 20, 2017

(54) DEVELOPMENT ENVIRONMENT SYSTEM, DEVELOPMENT ENVIRONMENT APPARATUS, DEVELOPMENT ENVIRONMENT PROVIDING METHOD, AND PROGRAM

(71) Applicant: MITSUBISHI ELECTRIC CORPORATION, Tokyo (JP)

(72) Inventors: Yusuke Kaneki, Tokyo (JP); Masafumi Harada, Tokyo (JP); Takayuki Tamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/785,832

(22) PCT Filed: Jun. 12, 2013

(86) PCT No.: PCT/JP2013/066222
§ 371 (c)(1),
(2) Date: Oct. 20, 2015

(87) PCT Pub. No.: WO2014/199464
PCT Pub. Date: Dec. 18, 2014

(65) Prior Publication Data
US 2016/0070565 A1    Mar. 10, 2016

(51) Int. Cl.
*G06F 9/44* (2006.01)
(52) U.S. Cl.
CPC . *G06F 8/70* (2013.01); *G06F 8/71* (2013.01)
(58) Field of Classification Search
USPC .......................................................... 717/101
See application file for complete search history.

(56) References Cited

U.S. PATENT DOCUMENTS 5,745,686 A * 4/1998 Saito ................... G06F 11/3476
717/168
7,058,660 B2 * 6/2006 Scott ...................... G06Q 10/04
717/101

(Continued)

FOREIGN PATENT DOCUMENTS

CN    101529414 A    9/2009
CN    102196006 A    9/2011

(Continued)

OTHER PUBLICATIONS

Riddle, "Software Development Environments", Apr. 19, 2007, IP.com No. IPCOM000015952D.*

(Continued)

*Primary Examiner* — Wei Zhen
*Assistant Examiner* — Junchun Wu
(74) *Attorney, Agent, or Firm* — Birch, Stewart, Kolasch & Birch, LLP

(57) ABSTRACT

There is provided a development environment system that appropriately controls the version of a development environment and prevents a conflict between a plurality of users over the same program. The development environment system includes a work area managing unit that allocates a work area 126 associated with user information, to a development environment apparatus when a user logs in; and a development environment managing unit 122 that extracts, from a development environment repository 123, a development environment associated with a development environment ID included in a development environment use request from the user, and makes the allocated work area 126 and the extracted development environment available. The development environment managing unit 122 disposes, on a development environment server 100, a development environment service unit 125 that executes a development environment service for a program and disposes, on a client (Continued)

terminal 200, a development environment client unit 202 which is a user interface of the development environment service unit 125.

13 Claims, 18 Drawing Sheets

(56) References Cited

U.S. PATENT DOCUMENTS

| | | | | |
|---|---|---|---|---|
| 8,341,618 | B2* | 12/2012 | Terasawa | G06F 8/61 717/168 |
| 8,453,104 | B2 | 5/2013 | Bergstrom et al. | |
| 8,776,021 | B1* | 7/2014 | Suttle | G06F 11/3684 717/121 |
| 2004/0181662 | A1* | 9/2004 | Kanai | H04L 63/08 713/155 |
| 2007/0234272 | A1* | 10/2007 | Hegyi | G06F 8/20 717/101 |
| 2008/0059943 | A1* | 3/2008 | Krevs | G06F 8/65 717/103 |
| 2008/0127135 | A1* | 5/2008 | Bergstrom | G06F 8/71 717/140 |
| 2010/0058342 | A1 | 3/2010 | Machida | |
| 2012/0066665 | A1 | 3/2012 | Kunze | |
| 2013/0014107 | A1 | 1/2013 | Kirchhofer | |
| 2013/0024854 | A1* | 1/2013 | Kumagai | G06F 8/67 717/174 |
| 2014/0101631 | A1* | 4/2014 | Hughes | G06F 8/20 717/101 |
| 2015/0135160 | A1* | 5/2015 | Gauvin | G06F 8/71 717/100 |
| 2015/0160796 | A1* | 6/2015 | Chen | G06F 3/04815 715/783 |
| 2016/0070547 | A1* | 3/2016 | Ramanathan | G06F 8/36 717/107 |

FOREIGN PATENT DOCUMENTS

| | | |
|---|---|---|
| CN | 102427480 A | 4/2012 |
| CN | 102523308 A | 6/2012 |
| EP | 0 538 860 A2 | 4/1993 |
| JP | 5-113877 A | 5/1993 |
| JP | 2000-76049 A | 3/2000 |
| JP | 2001-34461 A | 2/2001 |
| JP | 2002-278759 A | 9/2002 |
| JP | 2003-6018 A | 1/2003 |
| JP | 2004-21608 A | 1/2004 |
| JP | 2004-118587 A | 4/2004 |
| JP | 2010-508580 A | 3/2010 |
| JP | 2010-72830 A | 4/2010 |
| KR | 10-2006-0069576 A | 6/2006 |
| KR | 10-2009-0073177 A | 7/2009 |
| KR | 10-2011-0113160 A | 10/2011 |
| TW | M430665 U1 | 6/2012 |
| TW | 201308073 A1 | 2/2013 |
| WO | WO 2008/051695 A1 | 5/2008 |
| WO | WO 2008/084826 A1 | 7/2008 |

OTHER PUBLICATIONS

Castillo et al., "Resource Co-Allocation for Large-Scale Distributed Environments", 2009, ACM.*

Quan et al., "A Cross-platform Application Development Environment Supported by Cloud Service", 2012, IEEE.*

Mwangama et al., "Charging and Billing for Composite Services in a Multi-Service Provider Environment", 2010, IEEE.*

* cited by examiner

Fig. 3

114 : CONFIGURATION INFORMATION TABLE

1141 : CONFIGURATION MANAGEMENT TABLE

| USER ID | PROGRAM ID | DEVELOPMENT ENVIRONMENT ID | CONTROL APPARATUS ID |
|---|---|---|---|
| U001 | P001 | D001 | A001 |
| U002 | P001 | D002 | A002 |
| U003 | P003 | D003 | A002 |

1142 : PROGRAM INFORMATION TABLE

| PROGRAM ID | PROGRAM NAME | VERSION |
|---|---|---|
| P001 | X APPARATUS MODULE | 1.0 |
| P002 | Y APPARATUS MODULE | 1.0 |
| P003 | Y APPARATUS MODULE | 2.0 |

1143 : DEVELOPMENT ENVIRONMENT INFORMATION TABLE

| DEVELOPMENT ENVIRONMENT ID | DEVELOPMENT ENVIRONMENT NAME | VERSION |
|---|---|---|
| D001 | X APPARATUS DEVELOPMENT ENVIRONMENT | 1.0 |
| D002 | X APPARATUS DEVELOPMENT ENVIRONMENT | 2.0 |
| D003 | Y APPARATUS DEVELOPMENT ENVIRONMENT | 1.0 |

1144 : CONTROL APPARATUS INFORMATION TABLE

| CONTROL APPARATUS ID | CONTROL APPARATUS NAME | SERIAL ID |
|---|---|---|
| A001 | X APPARATUS | X000001 |
| A002 | Y APPARATUS | Y000001 |

Fig. 7

130 : ACCESS RIGHT TABLE

1301 : USER INFORMATION ACCESS RIGHT TABLE

| SUBJECT USER ID | OBJECT USER ID | ACCESS RIGHT |
|---|---|---|
| U001 | U001 | CHANGE |
| U001 | U002 | CHANGE |
| U001 | U003 | READ |
| U002 | U002 | CHANGE |
| U002 | U001 | READ |
| U002 | U003 | READ |
| U003 | U003 | CHANGE |
| U003 | U001 | READ |
| U003 | U002 | READ |
| U004 | U004 | CHANGE |

1302 : PROGRAM ACCESS RIGHT TABLE

| SUBJECT USER ID | OBJECT PROGRAM ID | ACCESS RIGHT |
|---|---|---|
| U001 | P001 | CHANGE |
| U002 | P001 | READ |
| U003 | P001 | READ |
| U001 | P002 | CHANGE |
| U001 | P003 | CHANGE |

132: CODE-BY-CODE ACCESS RIGHT TABLE

| SUBJECT ID | OBJECT ID | PROGRAM PART | CODE-BY-CODE ACCESS RIGHT |
|---|---|---|---|
| U002 | P001 | CONSTANT K10 | CHANGE |
| U003 | P001 | NOT SPECIFIED | ADD |

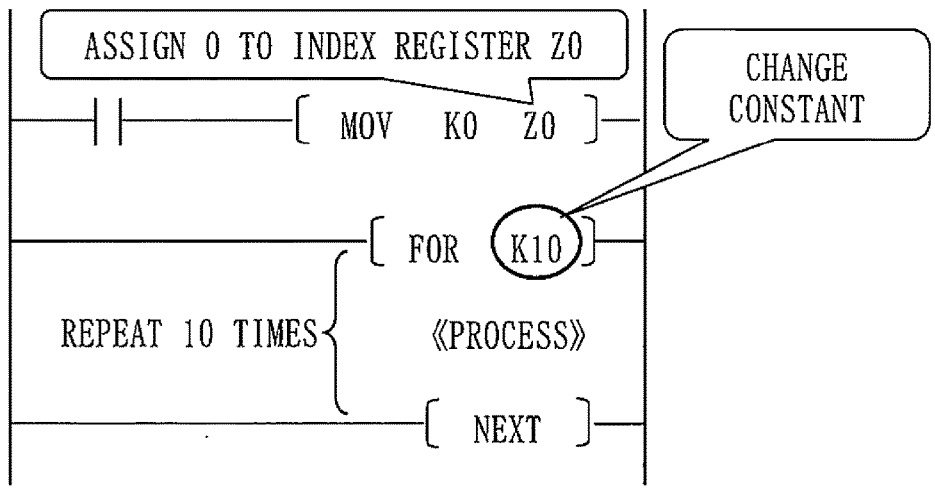
Fig.11
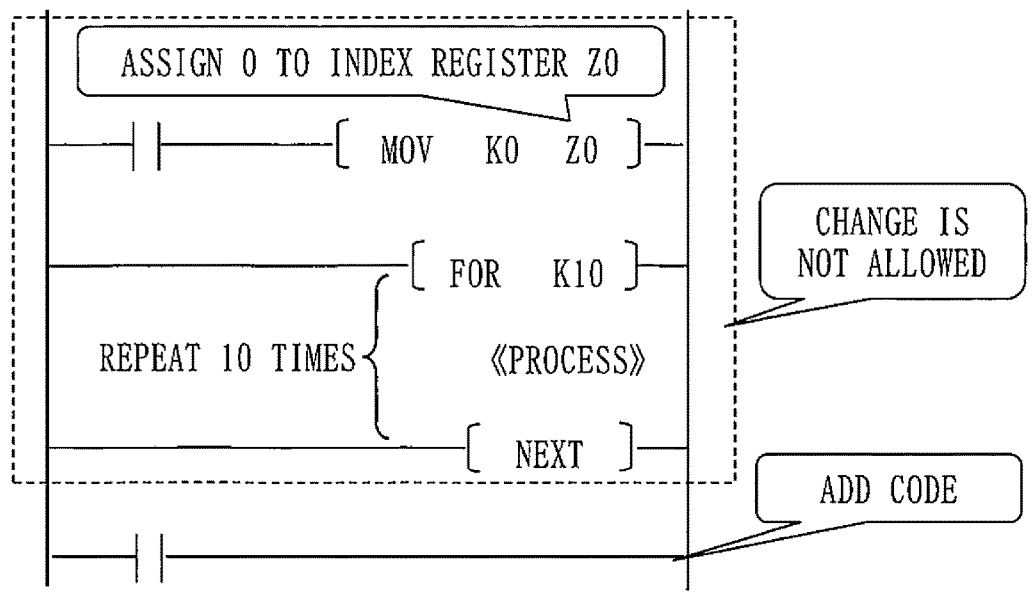

Fig.15

134 : EDIT LOCK TABLE
(EDIT LOCK INFORMATION STORAGE UNIT)

| PROGRAM ID | LOCKED AREA |
|---|---|
| P001 | LINE 10 |

Fig.17

135 : OPERATION HISTORY TABLE
(OPERATION HISTORY INFORMATION STORAGE UNIT)

| DATE | USER ID | DEVELOPMENT ENVIRONMENT ID | PROGRAM ID | CONTROL APPARATUS ID | OPERATION |
|---|---|---|---|---|---|
| 20130321 | U001 | D001 | P001 | A001 | WRITE TO APPARATUS |

DEVELOPMENT ENVIRONMENT SYSTEM, DEVELOPMENT ENVIRONMENT APPARATUS, DEVELOPMENT ENVIRONMENT PROVIDING METHOD, AND PROGRAM

TECHNICAL FIELD

The present invention relates to a development environment system, a development environment apparatus, a development environment providing method, and a program. More particularly, the present invention relates to a distributed shared type environment development apparatus that performs development of software in the development environment apparatus by operations from terminal apparatuses.

BACKGROUND ART

In recent years, an increase in the scale of control software that operates in factories, etc., such as a ladder program, has been advanced, and thus, it has become important to efficiently perform software asset management and joint development by a plurality of persons.

Previously, software is developed by installing a development environment on a PC (Personal Computer) of each developer in charge and thus is managed on the individual PCs. Hence, there is a problem, for example, that the same software differs in version between the PCs and accordingly conformity between a development environment and software version cannot be achieved.

To solve such a problem, a network type development environment is sought in which software and a development environment are managed by a server in a consolidated manner, and development is performed by connecting to the server via a network.

Patent Literature 1 discloses a method for remote operation type software that performs software development on the server side by remote operations from a client connected through a network. According to Patent Literature 1, on the client side, a development environment client unit and an input/output control unit operate. On the server side, an input/output control unit, a component repository, a component factory, an instance save processing unit, and a source code automatic generating unit operate. When a developer operates the development environment client unit on the client side, a process is transmitted from the input/output control unit on the client side to the input/output control unit on the server side via the Internet. The server side receives the process transmitted from the client side, and performs combining of components, automatic generation of source code, generation of an instance (program execution environment), etc., enabling development via the Internet.

CITATION LIST

Patent Literature

Patent Literature 1: JP 2002-278759 A

SUMMARY OF INVENTION

Technical Problem

In conventional art, there is no mechanism for controlling the version of a development environment. Hence, conventional art has a program that at a change in the version of a development environment, development environments on the server side and the client side cannot be changed.

In addition, conventional art has a problem that, when information which is collectively managed by the server is simultaneously developed by a plurality of users, the resolution of conflicts and the measures against access control are insufficient.

The present invention is made to solve problems such as those described above, and an object of the present invention is to provide a development environment system that appropriately controls the version of a development environment and resolves a conflict between a plurality of users over the same program.

Solution to Problem

A development environment system according to the present invention includes:

a terminal apparatus including a terminal-side transmitting unit that transmits an allocation request requesting to allocate a work area to be used to develop a program, and a use request requesting to use a development environment to be used to develop the program, the allocation request including user information identifying a user, and the use request including a development environment identifier identifying the development environment and the user information identifying the user; and a development environment apparatus including:

an allocating unit that receives the allocation request from the terminal-side transmitting unit and allocates, by a processing apparatus, a user work area associated with the user information included in the received allocation request;

a development environment storage unit that stores, in a storage apparatus, the development environment and the development environment identifier identifying the development environment in association with each other; and a development environment managing unit that receives the use request from the terminal-side transmitting unit, extracts, by a processing apparatus, the development environment associated with the development environment identifier included in the received use request, from the development environment storage unit, and makes the extracted development environment and the user work area available by a processing apparatus, the user work area being associated with the user information included in the use request.

Advantageous Effects of Invention

According to one aspect of the present invention, the allocating unit allocates a user work area associated with user information, to the development environment apparatus, and the development environment managing unit extracts, from the development environment storage unit, a development environment associated with a development environment identifier included in a use request and makes the allocated user work area and the extracted development environment available. Thus, even if the version of a development environment is changed, the change can be appropriately dealt with, and a conflict between a plurality of users can be resolved.

BRIEF DESCRIPTION OF DRAWINGS

FIG. 3 is a diagram showing a configuration of a configuration information table 114 according to the first embodiment.

FIG. 7 is a diagram showing a configuration of an access right table 130 according to the second embodiment.

FIG. 10 is a diagram showing an example of a change to a constant in ladder program development performed by a code-by-code access control unit 203 according to the third embodiment.

FIG. 11 is a diagram showing an example of addition of code in ladder program development performed by the code-by-code access control unit 203 according to the third embodiment.

FIG. 15 is a diagram showing a configuration of an edit lock table 134 according to the fifth embodiment.

FIG. 17 is a diagram showing a configuration of an operation history table 135 according to the sixth embodiment.

DESCRIPTION OF EMBODIMENTS

First Embodiment

Figure 1:
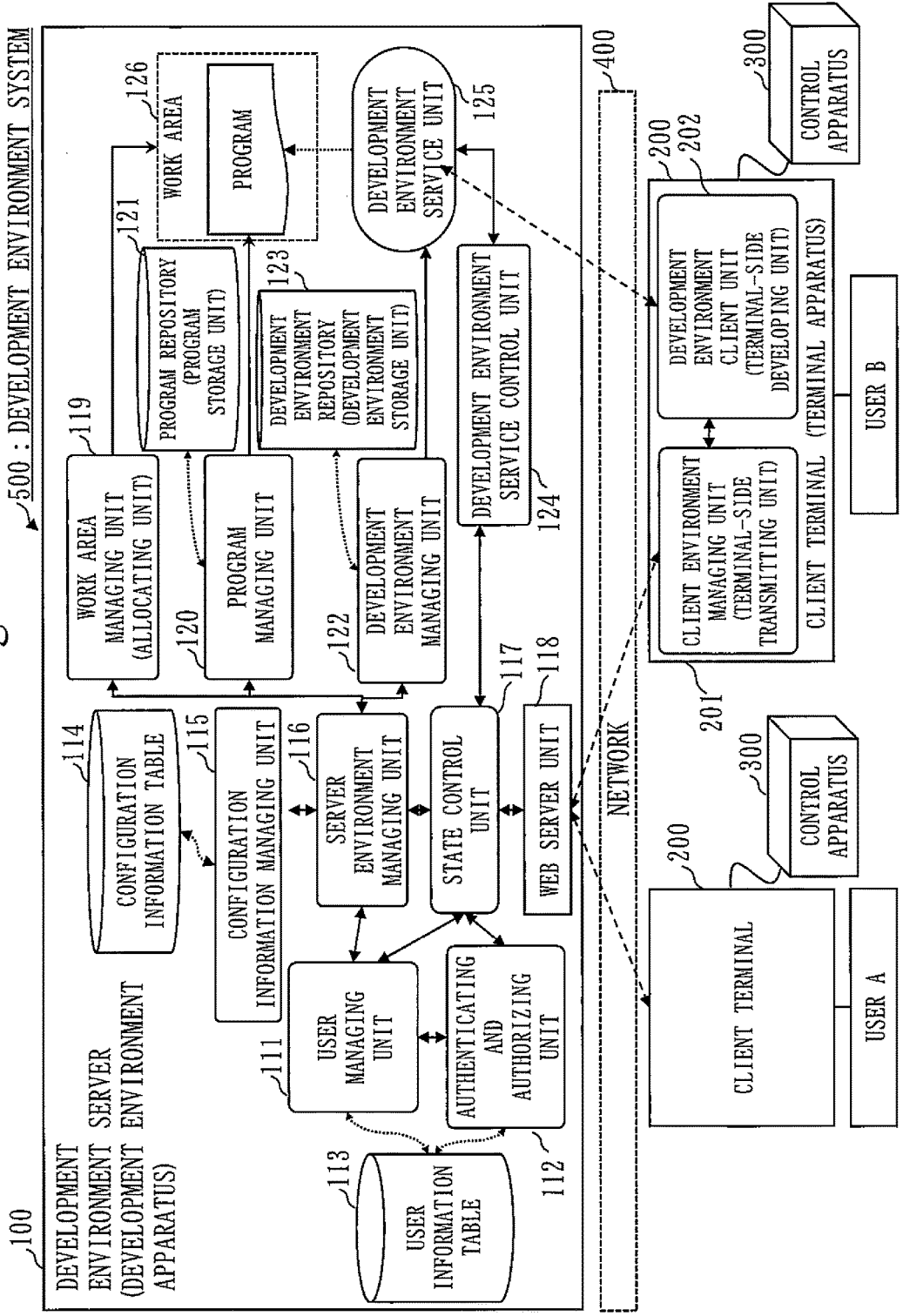
FIG. 1 is a block configuration diagram of a development environment system 500 according to a first embodiment.

FIG. 1 is a block configuration diagram of a development environment system 500 according to the present embodiment. Using FIG. 1, a block configuration of the development environment system 500 according to the present embodiment will be described.

The development environment system 500 includes a development environment server 100 (development environment apparatus) and client terminals 200 (terminal apparatuses). The development environment server 100 provides the client terminals 200 with a development environment for performing a program development process by a user.

The development environment is composed of a development environment service unit 125 that is executed as a development environment service which is provided upon program development; and a development environment client unit 202 that is executed as a user interface upon accessing the development environment service unit 125.

Although in FIG. 1 the development environment system 500 includes two client terminals 200 used by users, the development environment system 500 may include one or three or more client terminals 200.

The development environment server 100 and the client terminals 200 are connected to each other through a network 400. Control apparatuses 300 are connected to the client terminals 200, respectively. The control apparatuses 300 are an example of a terminal-side storage device to which a program developed using a development environment is written by a user operation.

A configuration of the client terminal 200 side will be described.

Each client terminal 200 includes a client environment managing unit 201 and a development environment client unit 202.

The client environment managing unit 201 accepts, from a user, a use request that requests use of a development environment. Based on the accepted use request, the client environment managing unit 201 includes, in a use request, a development environment ID (development environment identifier) that identifies the development environment, the use of which is requested by the user; and user information that identifies the user. The client environment managing unit 201 transmits the use request including the development environment ID and the user information, to the development environment server 100. The client environment managing unit 201 is an example of a terminal-side transmitting unit.

In addition, the client environment managing unit 201 calls various types of functions on the development environment server 100 side by user operations under the use of the development environment.

The development environment client unit 202 has a function corresponding to a user interface of the development environment.

The development environment client unit 202 is a user interface for performing a program development process by the user, using the development environment and a work area 126 (user work area) which are made available by the development environment server 100.

The development environment client unit 202 receives, from the development environment server 100, an interface program which is a user interface of a development program that develops a program. The development environment client unit 202 installs the received interface program on the client terminal 200. The development environment client unit 202 executes, by a processing apparatus, the installed interface program and thereby implements the function of the development environment client unit 202. The interface program may be hereinafter referred to as the development environment client unit 202. The development environment client unit 202 is an example of a terminal-side developing unit that accepts, from the user, a program development request using the development environment and the work area 126 (user work area) which are made available, and transmits the accepted development request to the development environment server 100.

When the user selects a development environment through the client environment managing unit 201, a development environment client unit 202 (interface program)

associated with the selected development environment is downloaded from the development environment server 100 side and installed on the client terminal 200 side. That is, the development environment client unit 202 is provided to the client terminal 200 when a development environment providing process by the development environment server 100 is performed.

The development environment client unit 202 calls a function on the development environment server 100 side, according to a development request from the user. The development environment client unit 202 may call a function on the development environment server 100 side through the client environment managing unit 201 or may call a function on the development environment server 100 side without through the client environment managing unit 201. In the case of a closed development environment process, the development environment client unit 202 directly calls the development environment service unit 125 which is executed on the development environment server 100 side.

A configuration of the development environment server 100 side will be described.

The development environment server 100 includes a web server unit 118, a state control unit 117, an authenticating and authorizing unit 112, a user managing unit 111, a user information table 113, a server environment managing unit 116, a configuration information managing unit 115, a configuration information table 114, a work area managing unit 119, a program managing unit 120, a program repository 121, a development environment managing unit 122, a development environment repository 123, and a development environment service control unit 124.

Figure 2:
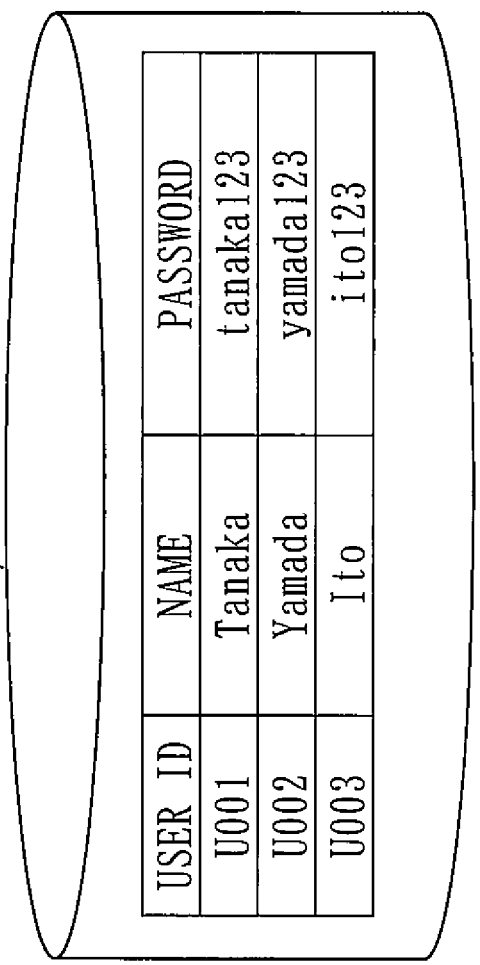
FIG. 2 is a diagram showing a configuration of a user information table 113 according to the first embodiment.

FIG. 2 is a diagram showing a configuration of the user information table 113 according to the present embodiment.

As shown in FIG. 2, the user information table 113 stores a user ID, a name, and a password in association with each other.

FIG. 3 is a diagram showing a configuration of the configuration information table 114 according to the present embodiment.

As shown in FIG. 3, the configuration information table 114 includes a configuration management table 1141, a program information table 1142, a development environment information table 1143, and a control apparatus information table 1144.

The program information table 1142 stores a program ID, a program name, and a program version in association with each other.

The program managing unit 120 obtains a program from the program repository 121, based on a program name and a version.

The development environment information table 1143 stores a development environment ID, a development environment name, and a version in association with each other. The development environment managing unit 122 obtains a development environment from the development environment repository 123, based on a development environment name and a version.

The control apparatus information table 1144 stores a control apparatus ID, a control apparatus name, and a serial ID that identifies a control apparatus in association with each other.

The configuration management table 1141 stores a user ID, a program ID, a development environment ID, and a control apparatus ID in association with each other.

The configuration information managing unit 115 manages the process of reading from the configuration information table 114 and the process of writing to the configuration information table 114.

The web server unit 118 performs a process based on a processing request from the client environment managing unit 201 of the client terminal 200 and transmits a processing result to the client environment managing unit 201. The processing request from the client environment managing unit 201 is, for example, a request for a login process (authentication request and allocation request), a request for a development environment providing process (use request), or a request for a program development process (development request), etc.

The state control unit 117 associates an HTTP access that does not have a state with a state of the development environment server 100 side. Specifically, the state control unit 117 issues a token that identifies a login user at the time point when a user is authenticated, and associates the user with the token. The token is an example of user information that identifies a user. The client terminal 200 and the development environment server 100 identify a user by transmitting and receiving the issued token. As such, the state control unit 117 links an HTTP access that does not have a state with a state of the development environment server 100 side.

The state control unit 117 can also associate an HTTP access that does not have a state with a state of the development environment server 100 side, using a user ID instead of a token. At this time, the user ID is an example of user information. However, in the case of using a user ID, there is a risk of spoofing. Thus, it is preferred that the state control unit 117 manage a state by issuing different tokens for every login.

The authenticating and authorizing unit 112 receives a user ID and a password and refers to the user information table 113. The user ID and the password are an example of an authentication request that requests user authentication. The authenticating and authorizing unit 112 checks the password based on the user information table 113 to authenticate a user. The authenticating and authorizing unit 112 is an example of a user authenticating unit that performs user authentication.

When a user is authenticated by the authenticating and authorizing unit 112 and logs in, the user managing unit 111 requests the server environment managing unit 116 to create a work area 126 for the user. The work area 126 is a directory on a file system on the development environment server 100 side. In addition, the user managing unit 111 accepts an inquiry about user information and a user registration operation from the client environment managing unit 201 and the server environment managing unit 116.

The server environment managing unit 116 outputs a user ID of the logged in user to the work area managing unit 119.

When user authentication is completed, the work area managing unit 119 allocates the work area 126 associated with the user, to a storage apparatus. That is, a user authentication request is an example of a work area allocation request.

The work area managing unit 119 manages the allocated work area 126 and the user information indicating the user in association with each other. The work area managing unit 119 creates, based on the user ID inputted from the server environment managing unit 116, a work area 126 (user work area) having a name that is uniquely associated with the user ID.

The development environment repository 123 stores a development environment associated with a development environment ID (development environment identifier). The development environment repository 123 is an example of a development environment storage unit that stores, in a storage apparatus, a development environment and a development environment ID that uniquely identifies the development environment in association with each other.

The development environment repository 123 stores, as a development environment, a development environment service (development program) that develops a program, and a user interface program which is a user interface of the development environment service.

The development environment managing unit 122 obtains, from the development environment repository 123, a development environment associated with a development environment ID which is selected by the user.

The development environment managing unit 122 receives a development environment use request from the client environment managing unit 201 through the web server unit 118, the state control unit 117, and the server environment managing unit 116 and extracts, from the development environment repository 123, a development environment associated with a development environment ID which is included in the received use request. The development environment managing unit 122 makes the extracted development environment available to the client terminal 200.

The development environment managing unit 122 installs a development environment service unit 125 on the development environment server 100 and installs a development environment client unit 202 on the client terminal 200, and thereby enables to develop a program in the user work area 126 using the development environment. The development environment service unit 125 installs and executes the development program by a processing apparatus, and thereby implements a development environment service function. The development environment service unit 125 may be hereinafter referred to as a development program. The development environment service unit 125 operates on the development environment server 100 side. The development environment client unit 202 functions on the client terminal 200 side, as a user interface of the development environment service unit 125.

When the development environment client unit 202 is started, for example, a development environment operation screen is displayed on a display apparatus of the client terminal 200. The user develops a program through the development environment operation screen. The user calls a necessary development environment service unit 125 through the development environment operation screen to develop a program.

The development environment client unit 202 may call the development environment service unit 125 via the client environment managing unit 201.

The development environment service control unit 124 controls the development environment service unit 125 which operates on the development environment server 100 side. For example, the development environment service control unit 124 controls the operation of the development environment service unit 125 for when the development environment service unit 125 is called via the client environment managing unit 201.

The program repository 121 stores a program associated with a program ID (program identifier). The program repository 121 is an example of a program storage unit that stores, in a storage apparatus, a program and a program ID that uniquely identifies the program in association with each other.

The program managing unit 120 receives a program development request including a program ID which is selected by the user, from the client environment managing unit 201 through the web server unit 118, the state control unit 117, and the server environment managing unit 116. The program managing unit 120 obtains a program from the program repository 121, based on the program ID selected by the user. The program managing unit 120 expands the obtained program in the user work area 126 which is created upon the login.

Figure 4:
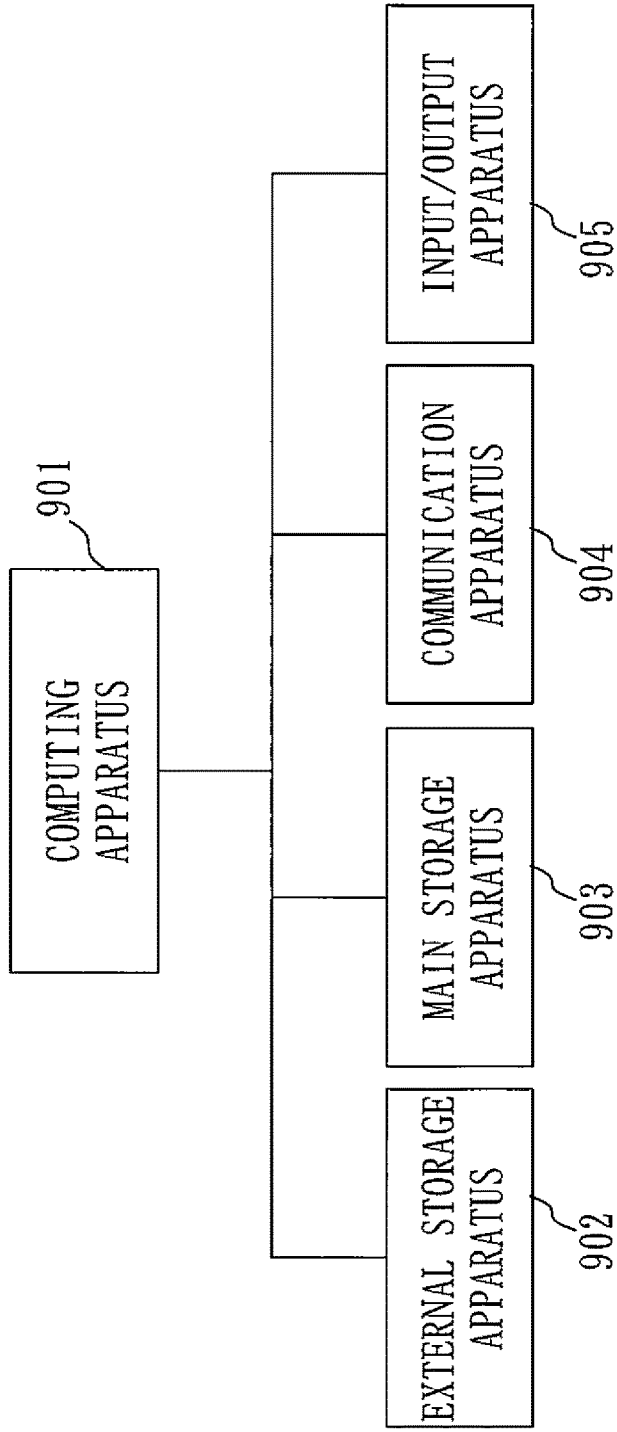
FIG. 4 is a diagram showing an example of a hardware configuration of a development environment server 100 and a client terminal 200 according to the first embodiment.

FIG. 4 is a diagram showing an example of a hardware configuration of the development environment server 100 and the client terminal 200 according to the present embodiment.

Using FIG. 4, an exemplary hardware configuration of the development environment server 100 and the client terminal 200 will be described.

The development environment server 100 and the client terminal 200 are computers. Each component of the development environment server 100 and the client terminal 200 can be implemented by a program.

The hardware configuration of the development environment server 100 and the client terminal 200 is such that a computing apparatus 901, an external storage apparatus 902, a main storage apparatus 903, a communication apparatus 904, and an input/output apparatus 905 are connected to a bus.

The computing apparatus 901 is a CPU (Central Processing Unit) that executes programs.

The external storage apparatus 902 is, for example, a ROM (Read Only Memory), a flash memory, or a hard disk apparatus.

The main storage apparatus 903 is a RAM (Random Access Memory).

The communication apparatus 904 is, for example, a communication board and is connected to a LAN (Local Area Network), etc. In addition to the LAN, the communication apparatus 904 may be connected to a WAN (Wide Area Network) such as an IP-VPN (Internet Protocol Virtual Private Network), a wide area LAN, or an ATM (Asynchronous Transfer Mode) network, or the Internet. The LAN, the WAN, and the Internet are examples of a network.

The input/output apparatus 905 is, for example, a mouse, a keyboard, and a display apparatus. Instead of the mouse, a touch panel, a touchpad, a trackball, a pen tablet, or other pointing devices may be used. The display apparatus may be an LCD (Liquid Crystal Display), a CRT (Cathode Ray Tube), or other display apparatuses.

A program is normally stored in the external storage apparatus 902. With the program loaded into the main storage apparatus 903, the program is sequentially read into the computing apparatus 901 and executed.

The program is a program that implements functions which are described as " . . . units" shown in FIG. 1.

Furthermore, the external storage apparatus 902 also stores an operating system (OS). At least a part of the OS is loaded into the main storage apparatus 903, and the computing apparatus 901 executes the program that implements the functions of the " . . . units" shown in FIG. 1 while executing the OS.

In addition, an application program is also stored in the external storage apparatus 902. With the application program loaded into the main storage apparatus 903, the application program is sequentially executed by the computing apparatus 901. In addition, information on the "... tables", etc., is also stored in the external storage apparatus 902.

In addition, information indicating the results of processes which are described as "judgment of ...", "determination of ...", "extraction of ...", "detection of ...", "setting of...", "registration of...", "selection of...", "generation of ...", "input of ...", "output of ...", etc., in the description of the present embodiment, data, signal values, or variable values are also stored, as files, in the main storage apparatus 903.

In addition, data received by the development environment server 100 and the client terminal 200 is stored in the main storage apparatus 903.

In addition, encryption keys/decryption keys, random number values, and parameters may be stored, as files, in the main storage apparatus 903.

Note that the configuration of FIG. 4 merely shows an example of the hardware configuration of the development environment server 100 and the client terminal 200, and thus, the hardware configuration of the development environment server 100 and the client terminal 200 is not limited to that described in FIG. 4 and may be other configurations.

Figure 5:
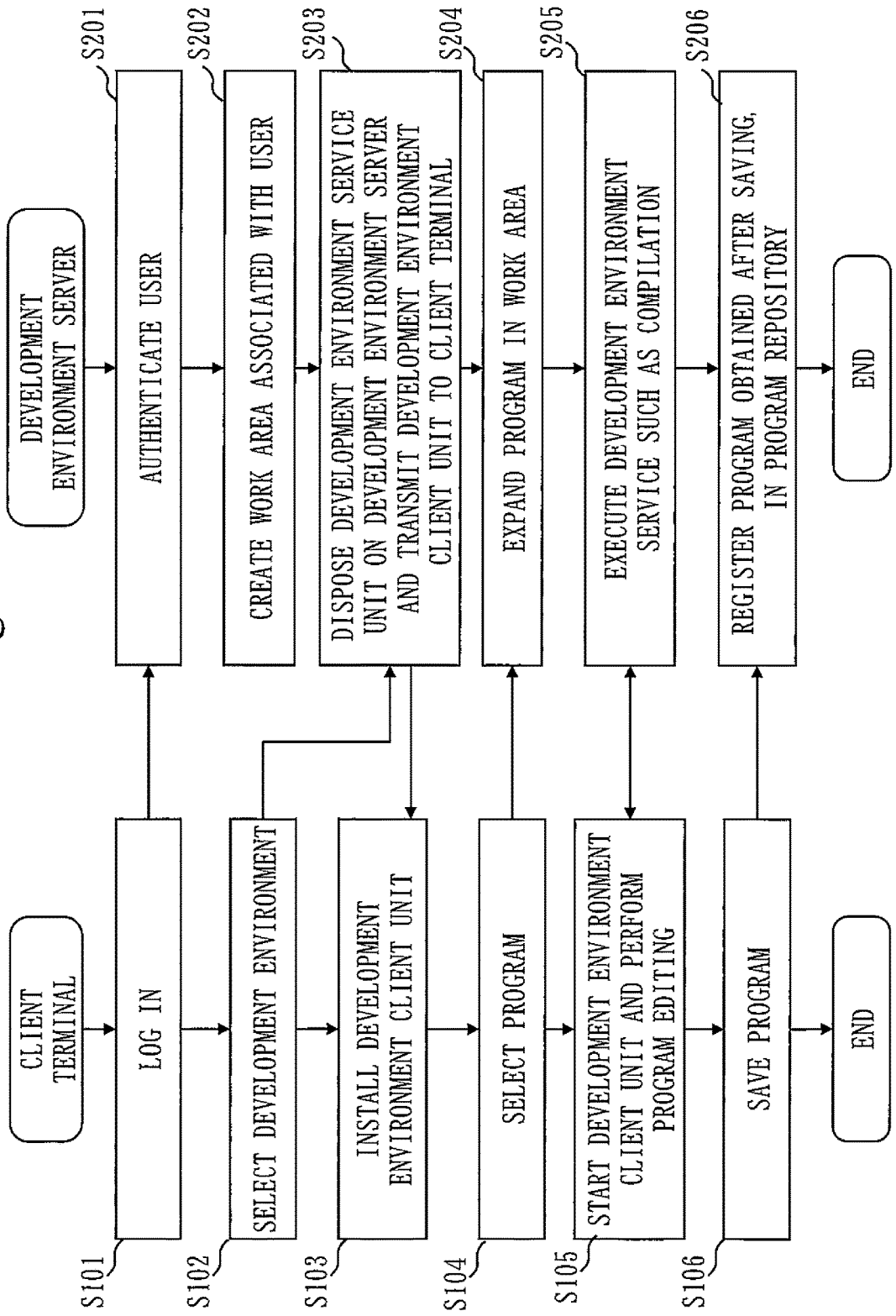
FIG. 5 is a flowchart showing the operation of a development environment providing process and a program development process performed by the development environment system 500 according to the first embodiment.

FIG. 5 is a flowchart showing the operation of a development environment providing process and a program development process performed by the development environment system 500 according to the present embodiment.

Using FIG. 5, the operation of a development environment providing process (development environment providing method) and a program development process (program development method) performed by the development environment server 100 and the client terminal 200 will be described.

At S101, the client environment managing unit 201 accepts login by a user.

At S201, the web server unit 118 accepts a login request from the client environment managing unit 201, and passes a user ID and a password to the authenticating and authorizing unit 112. The authenticating and authorizing unit 112 receives the user ID and the password and authenticates the user by referring to the user information table 113.

At S202, when the user authentication is completed, the user managing unit 111 requests the server environment managing unit 116 to create a work area 126 for the user. Based on the user ID inputted from the server environment managing unit 116, the work area managing unit 119 creates a work area 126 having a name that is uniquely associated with the user ID.

At S102, the user selects a development environment through the client environment managing unit 201 of the client terminal 200. The client environment managing unit 201 transmits a use request including a development environment ID of the selected development environment, to the development environment server 100.

When the user wants to change the type or version of the development environment used thereby, the user reselects a development environment.

At S203, the development environment managing unit 122 obtains the development environment ID included in the use request which is transmitted from the client environment managing unit 201. The development environment managing unit 122 extracts a development environment from the development environment repository 123, based on the obtained development environment ID. The development environment includes a development environment service unit 125 and a development environment client unit 202.

The development environment managing unit 122 disposes the development environment service unit 125 included in the extracted development environment, on the development environment server 100 side. In addition, the development environment managing unit 122 transmits the development environment client unit 202 to the client environment managing unit 201.

At S103, the client environment managing unit 201 receives the development environment client unit 202 transmitted from the development environment managing unit 122. The client environment managing unit 201 installs the received development environment client unit 202 on the client terminal 200.

Next, a program development process of developing a program using the development environment which is made available by the development environment providing process performed by the development environment system 500 will be described.

At S104, the user selects a program to be developed at the client environment managing unit 201 on the client terminal 200 side. The client environment managing unit 201 transmits a development request including a program ID of the selected program, to the development environment server 100.

At S204, the program managing unit 120 receives the development request transmitted from the client environment managing unit 201. The program managing unit 120 obtains a program from the program repository 121, based on the program ID included in the received development request. The program managing unit 120 stores the obtained program in the work area 126 created upon the login.

At S105, the development environment client unit 202 installed on the client terminal 200 side is started. The user can produce and edit the program, using a user interface function of the started development environment client unit 202. The started development environment client unit 202 is in a state of being ready to develop the program. It is also possible to read another program after starting the development environment client unit 202.

Editing of the program by the user is processed in the development environment client unit 202 on the client terminal 200 side.

Meanwhile, when the user performs an operation to request a development environment service process to be processed by the development environment server 100 side such as program compilation, the development environment service unit 125 on the development environment server 100 side operates and performs a development environment service process. The development environment service unit 125 has a service process block for each server-side process such as a compilation process or a debugging process.

At S205, the development environment service unit 125 calls a service process block corresponding to the development environment service process which is requested by the user, and the process is performed on the server side. The development environment service unit 125 returns only the result of performance of the service process block to the client terminal 200 side.

At S106, the development environment client unit 202 accepts a program save operation from the user. The development environment client unit 202 transmits a program save request to the development environment server 100.

At S206, the development environment service unit 125 reflects the content of changes made on the client terminal 200 side, in a file in the work area 126 where the program is stored. When the user performs version registration upon the user's save operation at S106, the client environment managing unit 201 accepts a version registration operation from the user. After completing the saving of the program in the work area 126, the program managing unit 120 registers the program file in the work area 126, in the program repository 121. The registration may be performed on a file-by-file basis or may be performed on a folder-by-folder basis. Upon registration after the first registration, the program managing unit 120 registers only differences made by changes to the program.

Description of the development environment providing process and the program development process performed by the development environment system 500 ends here.

As described above, according to the development environment system 500 according to the present embodiment, the work area managing unit 119 creates a work area 126 with a directory name which is unique to a user ID. Hence, in the development environment system 500, even if a plurality of users simultaneously access the work area 126, a conflict does not occur.

The program managing unit 120 copies a program from the program repository 121 to a work area 126 provided for each user. Each user edits the program copied to its work area 126. Hence, a plurality of users can simultaneously edit the same program.

When the program managing unit 120 registers changes to a program in the program repository 121, there may be a case in which other changes may be already registered by another user and accordingly a conflict occurs between the changed portions. Since the program managing unit 120 manages a change status on a file-by-file basis, the program managing unit 120 can detect a conflict between changed portions.

For example, when the program managing unit 120 detects a file conflict, the program managing unit 120 notifies the user of the detection of the conflict. When the user is notified of the detection of the conflict, the user can perform the following three processes:

The first process is that the user registers the changed portion, ignoring the conflict. The second process is that if user's changes can be reflected while another user's changes are maintained, the user reflects and registers the changes. The third process is that the user registers his/her changes as another version.

To prevent a conflict such as that described above, when the user obtains a program for the first time, the user locks the program so that other users cannot obtain the program. Alternatively, when the user obtains a program for the first time, the user sets other users' authorities for the program to "read only" so that other users cannot edit the program.

As described above, the development environment system 500 according to the present embodiment achieves development environment version control, a changing of a development environment according to software version, and simultaneous development of the same program by a plurality of users, and accordingly, improves the development efficiency of a large-scale program.

Second Embodiment

The present embodiment mainly describes differences from the first embodiment.

Components having the same functions as those described in the first embodiment are denoted by the same reference signs and description thereof may be omitted.

Figure 6:
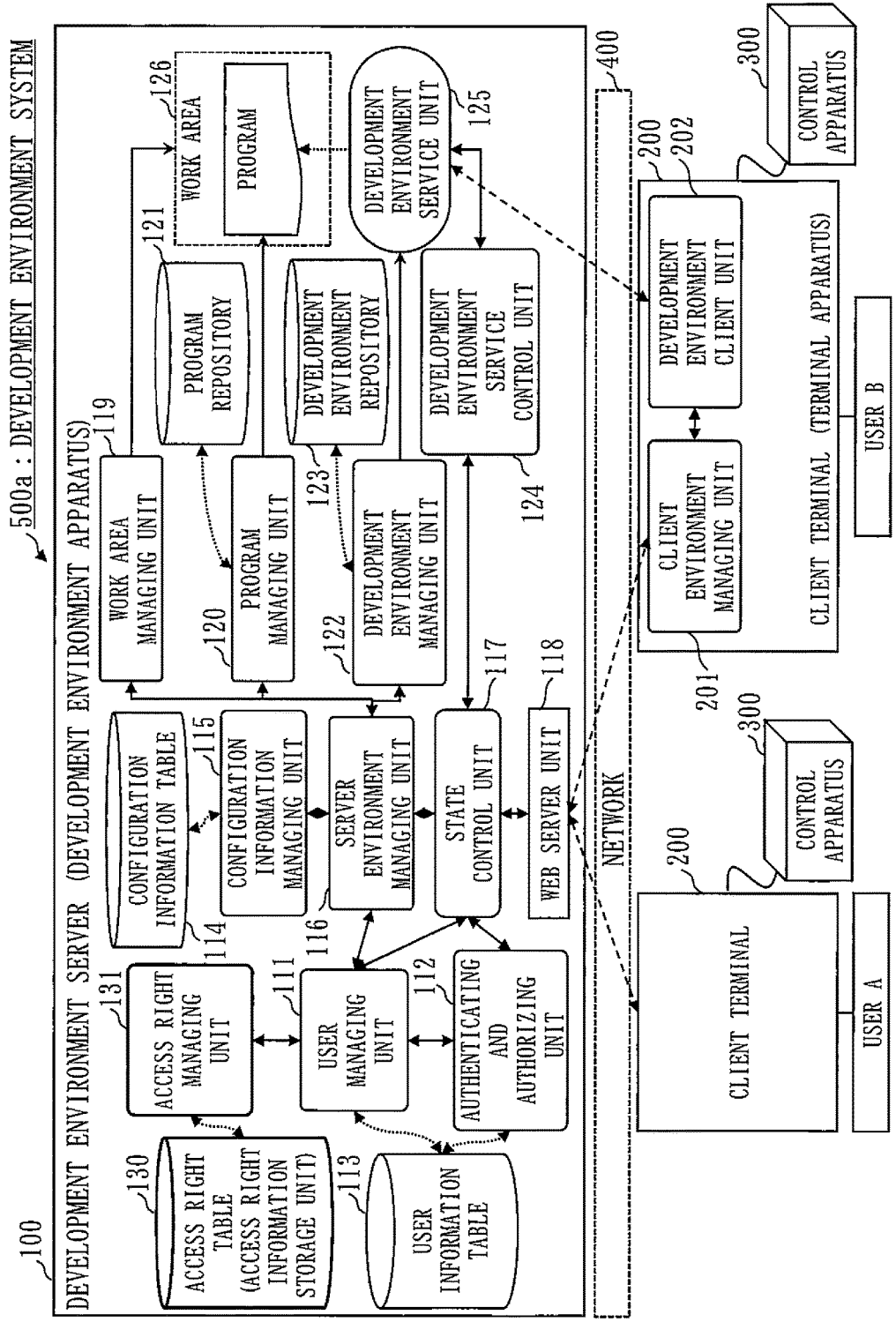
FIG. 6 is a diagram showing a block configuration of a development environment system 500a according to a second embodiment.

FIG. 6 is a diagram showing a block configuration of a development environment system 500a according to the present embodiment.

In the present embodiment, in addition to the first embodiment, an access right table 130 and an access right managing unit 131 are provided.

FIG. 7 is a diagram showing a configuration of the access right table 130 according to the present embodiment.

As shown in FIG. 7, the access right table 130 (access right information) includes a user information access right table 1301 and a program access right table 1302. The access right table 130 (access right information) is an example of an access right information storage unit.

The user information access right table 1301 stores a subject user ID, an object user ID, and an access right in association with each other. The subject user ID is a user ID of an accessing user. The object user ID is a user ID of an accessed user. The access right is, for example, read or change authority. The user information access right table 1301 is used when access control to a user information table 113 is performed.

The program access right table 1302 stores a subject user ID, an object program ID, and an access right in association with each other. The subject user ID is a user ID of an accessing user. The object program ID is a program ID of an accessed program. The access right is, for example, read or change authority. The program access right table 1302 is used when access control to a program is performed.

The access right managing unit 131 receives an access right change request from a client environment managing unit 201. The access right managing unit 131 changes an access right according to the access right change request, based on the user information access right table 1301 and the program access right table 1302.

When a user U001 has read authority to a user U002, the user U001 can know, by the user information table 113, that the user U002 is present. On the other hand, even if a user U004 is present, when the user U001 does not have read authority to the user U004, the user U001 cannot know the presence by the user information table 113.

A user can register another user in the user information table 113 and has change authority to the registered user. When the user U001 registers the user U002 in the user information table 113, the user U001 has change authority to the user U002 and thus can, for example, change the user information table 113 of the user U002 or delete the user U002.

When the user U001 has change authority to a program P001, the user U001 can edit the program P001. When the user U002 only has read authority to the program P001, the user U002 can view the program P001, but cannot edit the program P001. When a user creates a program, the user has change authority to the created program.

For example, the case will be described in which a development environment server 100 receives a program development request from a client terminal 200. The access right managing unit 131 refers to a program access right of a user having transmitted the development request, based on the program access right table 1302 in the access right table 130. When the access right is "change", a program development process continues and a program managing unit 120 expands a program in a work area 126. When the access right is "read", the client terminal 200 is notified of the fact that the user only has read authority to the program. Alternatively, when the access right is "read", the program managing unit 120 expands the program in the work area 126 and when the program managing unit 120 receives a program change request thereafter, the program managing unit 120 notifies the client terminal 200 of the fact that the user only has read authority to the program.

As described above, by introducing an operation to change an access right and an authority to an access right operation, an access right to user information or a program can be provided to another user. Authorities to an access right operation include, for example, read and change authorities. The authorities to an access right operation can also be introduced to the user information access right table 1301 and the program access right table 1302.

By the above-described configuration, a user is provided with an appropriate authority for program operations, by which necessary information can be disclosed, improving development efficiency.

Third Embodiment

The present embodiment mainly describes differences from the second embodiment.

Components having the same functions as those described in the first and second embodiments are denoted by the same reference signs and description thereof may be omitted.

Figure 8:
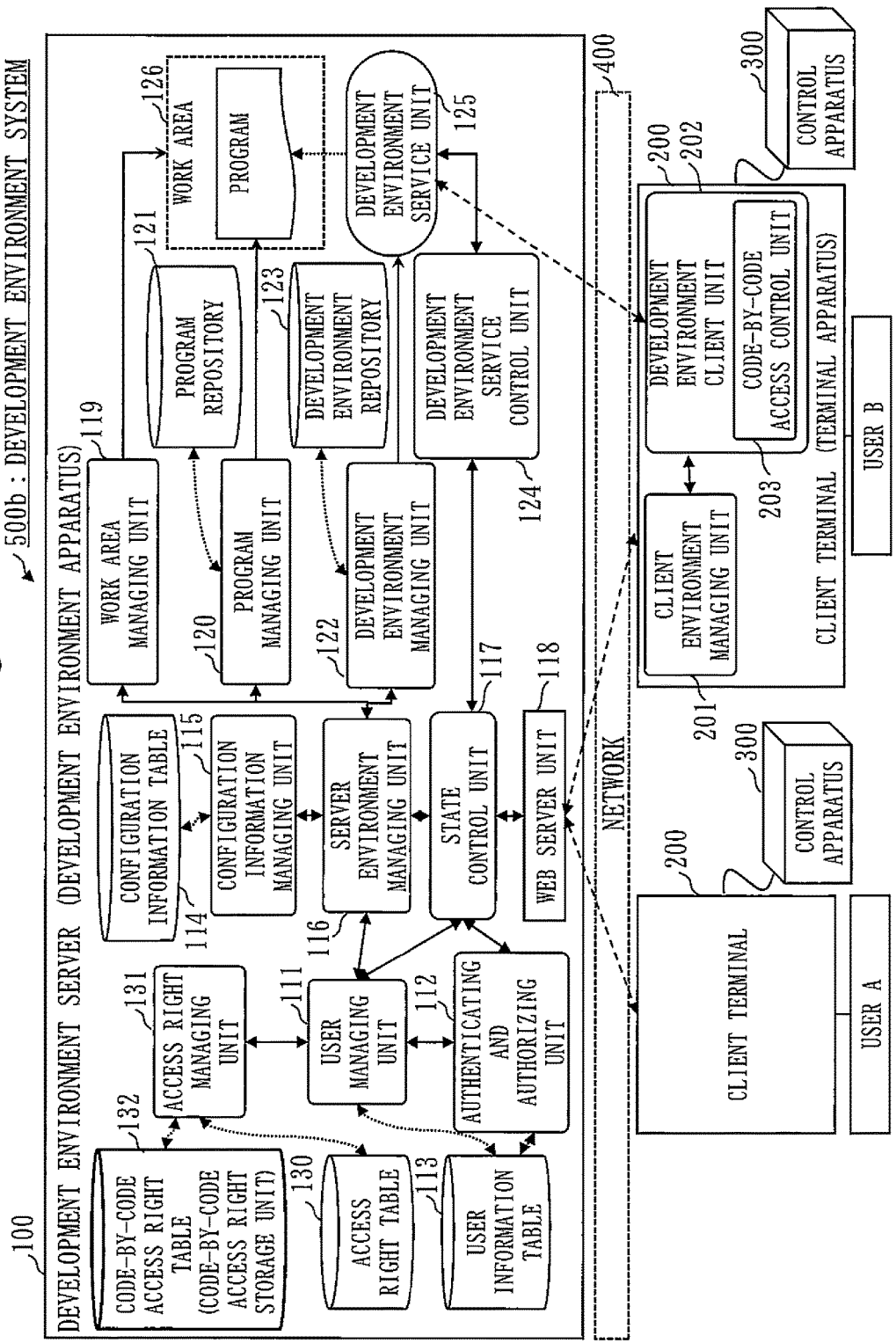
FIG. 8 is a diagram showing a block configuration of a development environment system 500b according to a third embodiment.

FIG. 8 is a diagram showing a block configuration of a development environment system 500*b* according to the present embodiment.

In the present embodiment, in addition to the second embodiment, a development environment server 100 includes a code-by-code access right table 132 (code-by-code access right information). In addition, a development environment client unit 202 of a client terminal 200 includes a code-by-code access control unit 203, in addition to the second embodiment. The code-by-code access right table 132 is an example of a code-by-code access right storage unit.

Figure 9:
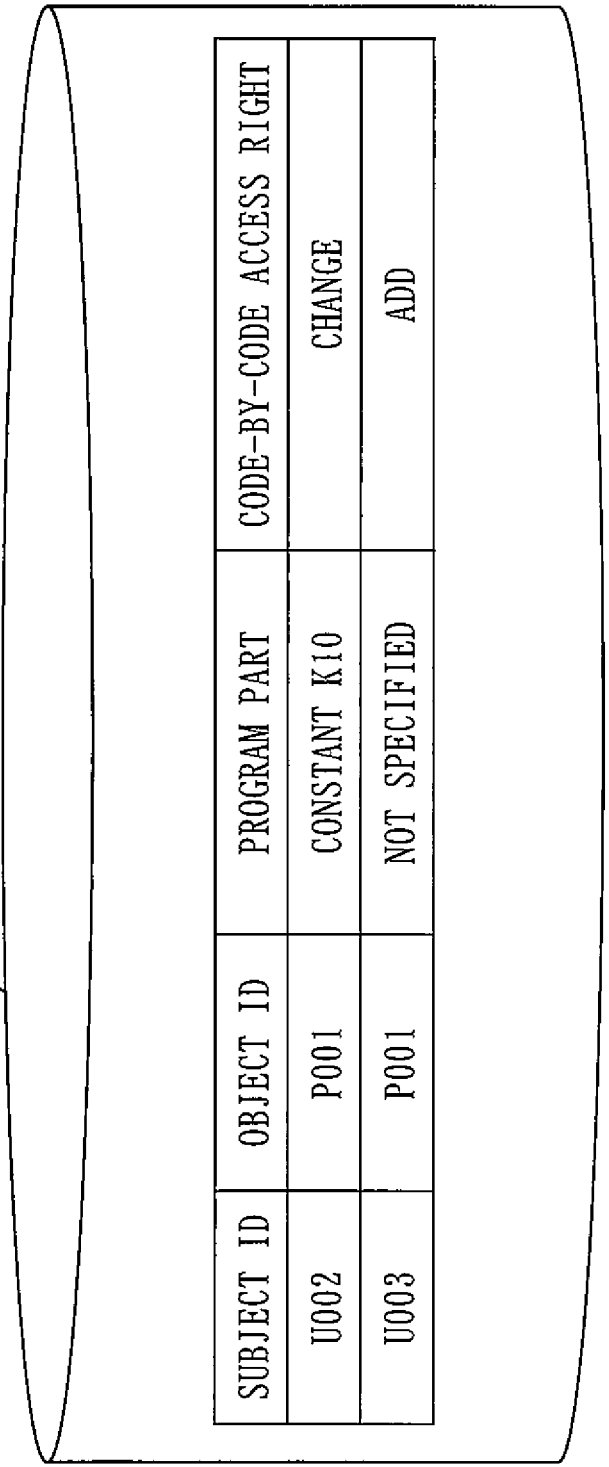
FIG. 9 is a diagram showing a configuration of a code-by-code access right table 132 according to the third embodiment.

FIG. 9 is a diagram showing a configuration of the code-by-code access right table 132 according to the present embodiment.

The code-by-code access right table 132 stores a subject user ID, an object program ID, an accessing program part, and a code-by-code access right in association with each other. The subject user ID is a user ID of an accessing user. The object program ID is a program ID of an accessed program. The code-by-code access right is, for example, "not allowed to read", "change", or "add" authority. The program part is a constant in a program, a code range, or the like.

The code-by-code access control unit 203 performs interface control for a program development process according to a user's code-by-code access right to a program part, based on the code-by-code access right table 132.

The code-by-code access control unit 203 detects a code-by-code access right of a logged in user. The code-by-code access control unit 203 controls an editor according to the code-by-code access right and performs interface control, such as not allowing to view a part having "not allowed to read" authority or not allowing to edit a part that does not have change authority.

FIG. 10 is a diagram showing an example of a change to a constant in ladder program development performed by the code-by-code access control unit 203 according to the present embodiment. FIG. 11 is a diagram showing an example of addition of code in ladder program development performed by the code-by-code access control unit 203 according to the present embodiment.

As shown in the code-by-code access right table 132 of FIG. 9, a user U002 has change authority to a "constant K10" in a program P001. In addition, as shown in the program access right table 1302 of FIG. 7, the user U002 only has read authority to the program P001. In the present embodiment, even if the user U002 only has read authority to the program P001, the user U002 can change only the value of the "constant K10" on a screen.

FIG. 10 shows a state in which the constant K10 is changed in a ladder program which is a programming language that controls a sequencer. In FIG. 10, the user U002 can only change the constant K10 (the number of loops).

As shown in the code-by-code access right table 132 of FIG. 9, a user U003 has add authority to the program P001. In addition, as shown in the program access right table 1302 of FIG. 7, the user U003 only has read authority to the program P001. In this case, the user U003 cannot change existing code in the program P001, but can newly add code.

FIG. 11 shows a state in which code is added in a ladder program. As shown in FIG. 11, the user U003 cannot change existing code which is indicated as a dotted portion, but can newly add code below the existing code. Note, however, that the user U003 cannot add code that refers to code with "not allowed to read" in the code-by-code access right table 132.

For the code-by-code access right, "not allowed to read", "change", and "add" authorities are described. For the code-by-code access right, in addition to them, for example, "read" and "not allowed to change" authorities may be allowed to be set. Authorities where the definitions of the code-by-code access rights can be briefly described without contradiction are prepared, and such code-by-code access rights can be set.

For a code change pattern, a change that specifies a constant name (K10) is described. In addition to that, the code change pattern may be a change pattern such as specifying all constants, specifying by a regular expression, or limiting a settable range such as the upper and lower limits of a constant.

As described above, according to the development environment system 500*b* according to the present embodiment, flexible access control can be performed where changes to program logic are not allowed, but small adjustments by changing constants are allowed. For example, by allowing an end user or maintenance personnel to perform only adjustments by changing constants, but not changes to a program, maintainability and development efficiency improve.

Fourth Embodiment

The present embodiment mainly describes differences from the third embodiment.

Components having the same functions as those described in the first to third embodiments are denoted by the same reference signs and description thereof may be omitted.

Figure 12:
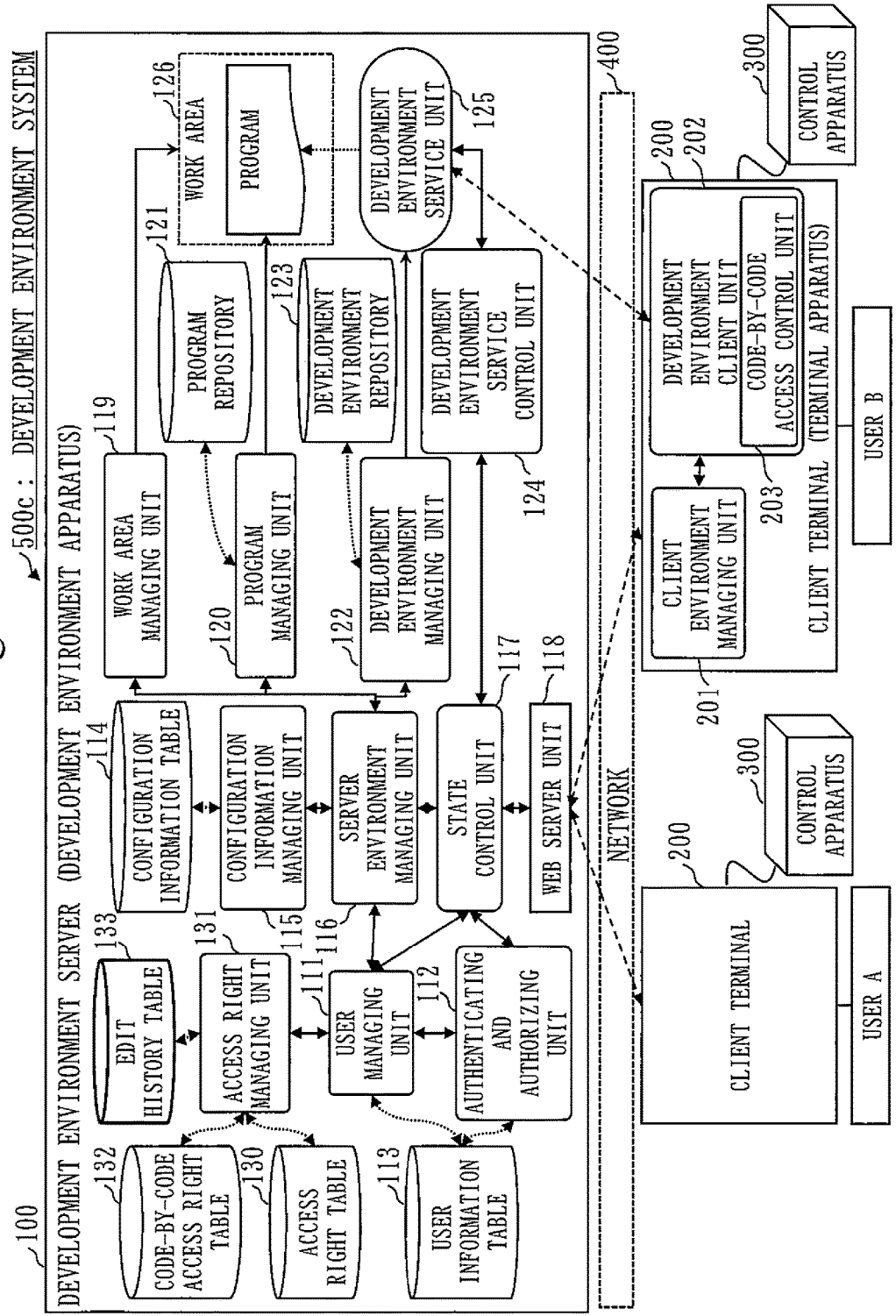
FIG. 12 is a diagram showing a block configuration of a development environment system 500c according to a fourth embodiment.
Figure 13:
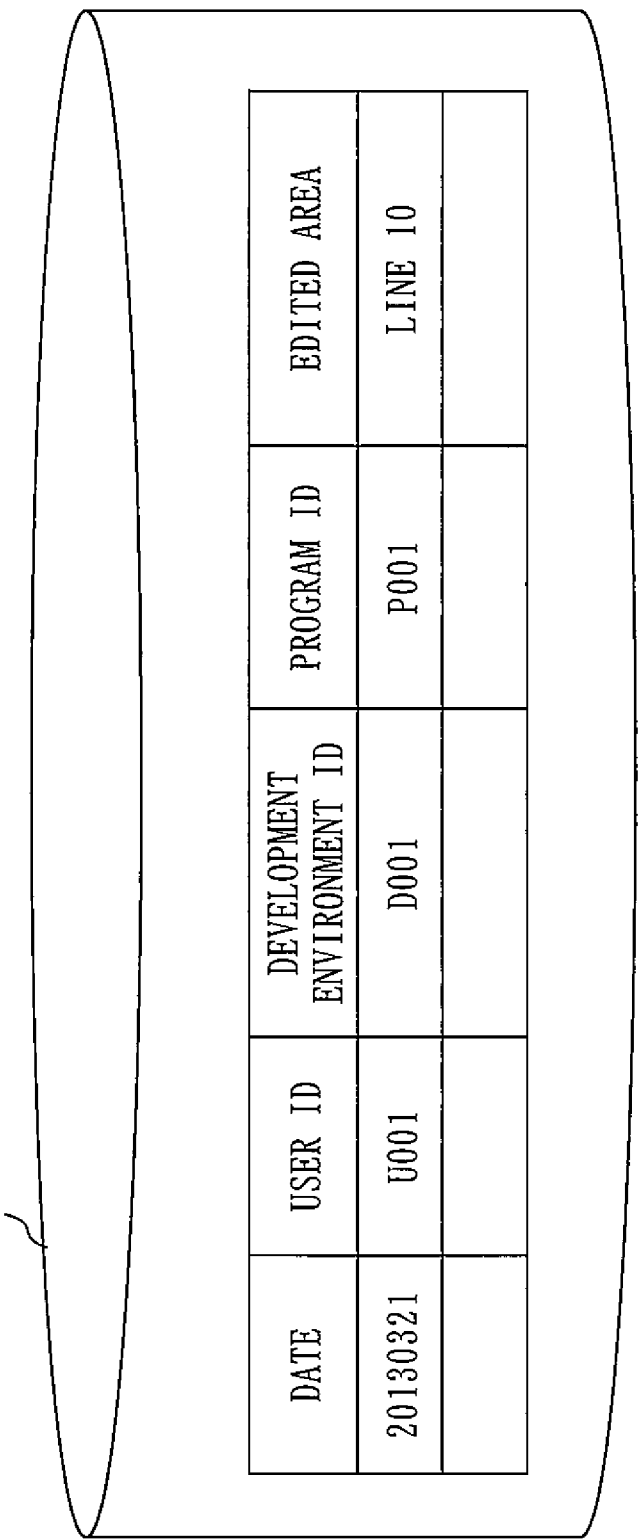
FIG. 13 is a diagram showing a configuration of an edit history table 133 according to the fourth embodiment.

FIG. 12 is a diagram showing a block configuration of a development environment system 500*c* according to the present embodiment. FIG. 13 is a diagram showing a configuration of an edit history table 133 according to the present embodiment.

As shown in FIG. 12, in addition to the configuration of the third embodiment, the development environment system 500*c* according to the present embodiment includes the edit history table 133 (edit history information). The edit history table 133 is an example of an edit history information storage unit.

As shown in FIG. 13, the edit history table 133 includes a date, a user ID, a development environment ID, a program ID, and an edited area. In the date, the date and time when the development environment system 500*c* is operated are stored. In the user ID, a user ID of a user having performed operations is stored. In the development environment ID, a development environment ID of a development environment used upon the operations is stored. In the program ID, a program ID of a program used upon the operations is stored. In the edited area, the location of code in the program where editing has been performed is recorded.

A code-by-code access control unit 203 detects a user's edited area by granularity (on a function-by-function or block-by-block basis) specified by a user and records the edited area in the edit history table 133. Every time the code-by-code access control unit 203 records an edited area in the edit history table 133, the code-by-code access control unit 203 checks whether another user has not edited the same edited area in the same program. If the code-by-code access control unit 203 judges that another user has edited the same edited area in the same program, the code-by-code access control unit 203 notifies the user, who is performing editing, of cancellation of the editing.

A method in which an edited area is specified by a code line number is described. For the edited area, in addition to that, other specification methods that can identify a code part, such as a package or a function, are also applicable.

As described above, according to the development environment system 500c according to the present embodiment, the efficiency of simultaneous development by a plurality of users improves.

Fifth Embodiment

The present embodiment mainly describes differences from the fourth embodiment.

Components having the same functions as those described in the first to fourth embodiments are denoted by the same reference signs and description thereof may be omitted.

Figure 14:
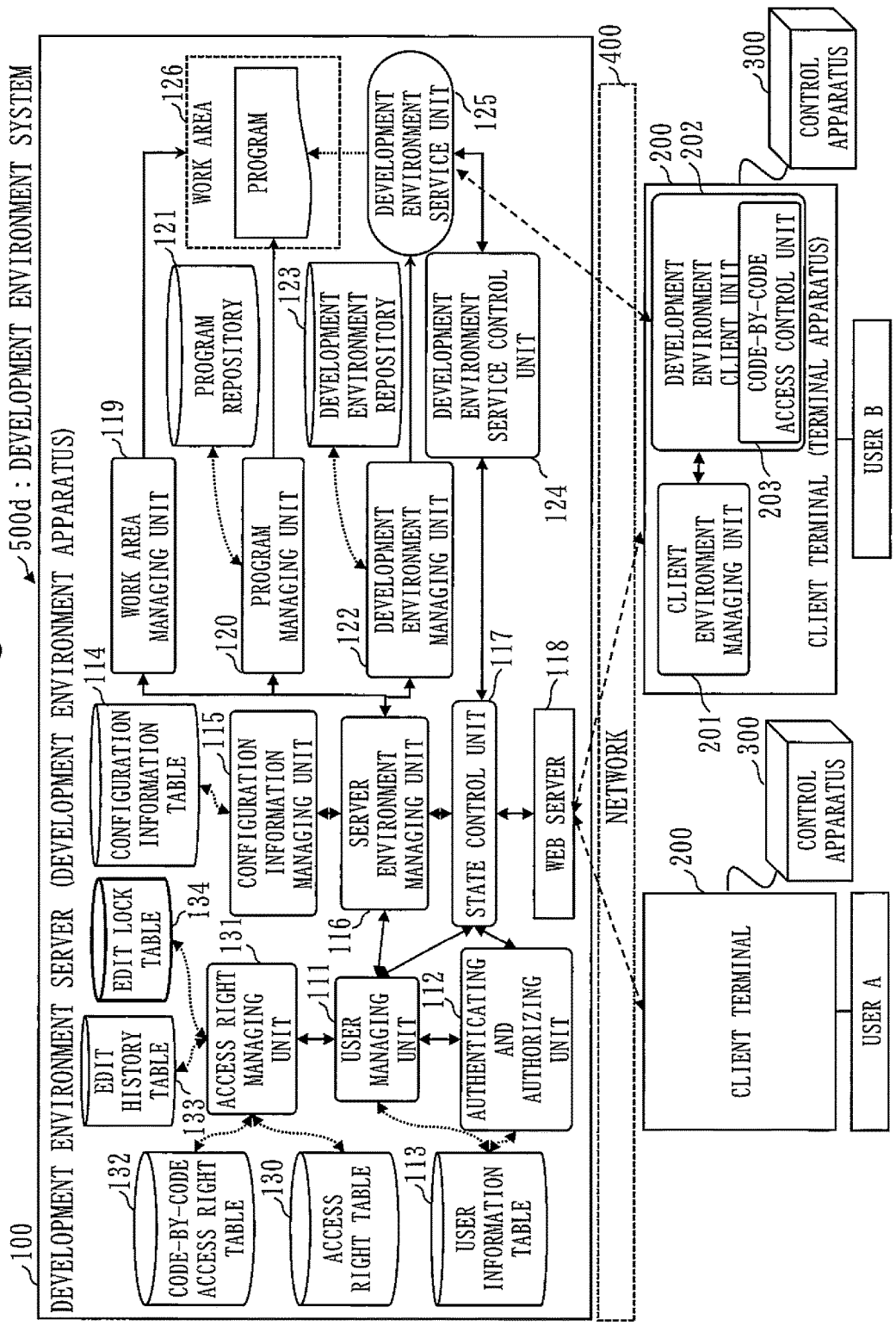
FIG. 14 is a diagram showing a block configuration of a development environment system 500d according to a fifth embodiment.

FIG. 14 is a diagram showing a block configuration of a development environment system 500d according to the present embodiment. FIG. 15 is a diagram showing a configuration of an edit lock table 134 according to the present embodiment. As shown in FIG. 14, in addition to the configuration of the fourth embodiment, the development environment system 500d according to the present embodiment includes the edit lock table 134 (edit lock information). The edit lock table 134 is an example of an edit lock information storage unit.

As shown in FIG. 15, the edit lock table 134 includes a program ID and a locked area. The edit lock table 134 shown in FIG. 15 indicates that line 10 of a program P001 is locked.

When a certain user edits code specified by a locked area in a program, an access right managing unit 131 records it in the edit lock table 134. By this, editing performed on the locked area of the program by another user is locked.

When a program is edited by a user, a code-by-code access control unit 203 determines whether the edited area of the program is a locked area, based on edit lock information stored in the edit lock information storage unit. If not locked, the code-by-code access control unit 203 records the edited area of the program in the edit lock table 134. If locked, the code-by-code access control unit 203 notifies the user of the fact that editing of the program is locked.

Although a method in which a locked area is specified by a code line number is described, other specification methods that can identify a code part, such as a package or a function, are also possible.

By the above-described configuration, flexible access control at code level can be performed and thus maintainability and development efficiency improve.

Sixth Embodiment

The present embodiment mainly describes differences from the first embodiment.

Components having the same functions as those described in the first embodiment are denoted by the same reference signs and description thereof may be omitted.

Figure 16:
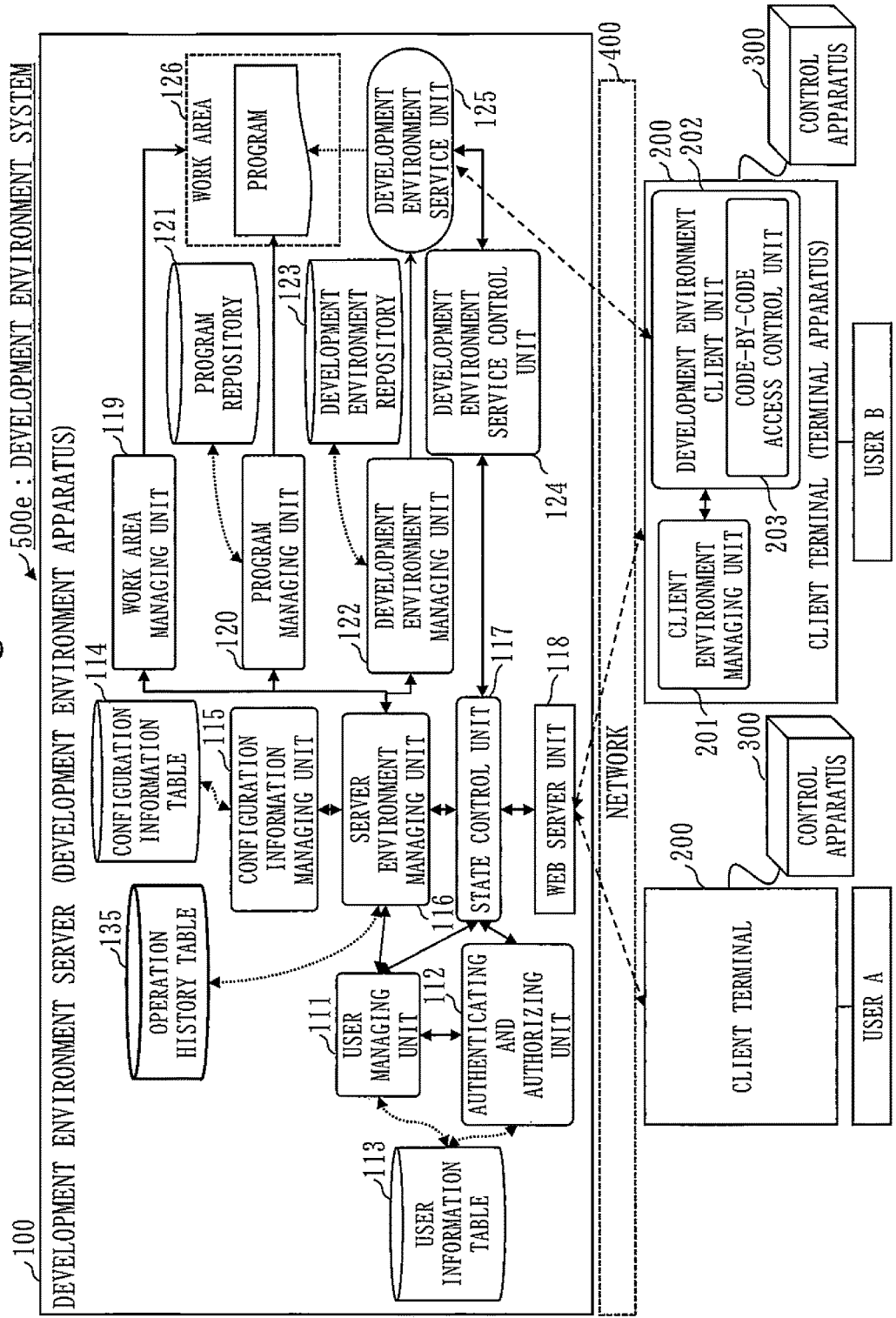
FIG. 16 is a diagram showing a block configuration of a development environment system 500e according to a sixth embodiment.

FIG. 16 is a diagram showing a block configuration of a development environment system 500e according to the present embodiment. FIG. 17 is a diagram showing a configuration of an operation history table 135 according to the present embodiment.

As shown in FIG. 16, in addition to the configuration of the first embodiment, the development environment system 500e according to the present embodiment includes the operation history table 135 (operation history information). The operation history table 135 is an example of an operation history information storage unit.

As shown in FIG. 17, the operation history table 135 includes a date, a user ID, a development environment ID, a program ID, a control apparatus ID, and an operation. In the date, the operation date and time when a user has performed an operation on a control apparatus (terminal-side storage device) are stored. In the user ID, a user ID of the user having performed the operation is stored. In the development environment ID, a development environment ID of a development environment used upon the operation is stored. In the program ID, a program ID of a program which is an operation target is stored. In the control apparatus ID, a control apparatus ID (terminal-side storage device identifier) of a control apparatus 300 on which the operation has been performed is stored. In the operation, the content of a process performed by the operation is stored.

When the process of writing a program to the control apparatus 300 is performed, the date and time, user ID, development environment ID, program ID, control apparatus ID, and write operation which is the content of an operation, for when the writing process is performed are recorded in the operation history table 135.

For the writing process to the operation history table 135, the writing is performed from a client terminal 200 to the development environment server 100 side via a network 400. Hence, the user performing the writing process is allowed to set the granularity of a history, taking into account network delay. Note, however, that processes that should be left in the history, such as a writing process to the control apparatus 300, may be always written regardless of the user's setting.

The operation history table 135 is allowed to be viewed by the user via a server environment managing unit 116.

According to the development environment system 500e according to the present embodiment, the traceability of a development environment, a program, a control apparatus, etc., is enhanced and thus maintainability and development efficiency improve.

Seventh Embodiment

The present embodiment mainly describes differences from the sixth embodiment.

Components having the same functions as those described in the sixth embodiment are denoted by the same reference signs and description thereof may be omitted.

The present embodiment describes a mechanism in which a program's development environment and a program's state for the time point where they need to be restored can be automatically restored by connecting a control apparatus 300 to a client terminal 200 when a user starts program development.

Figure 18:
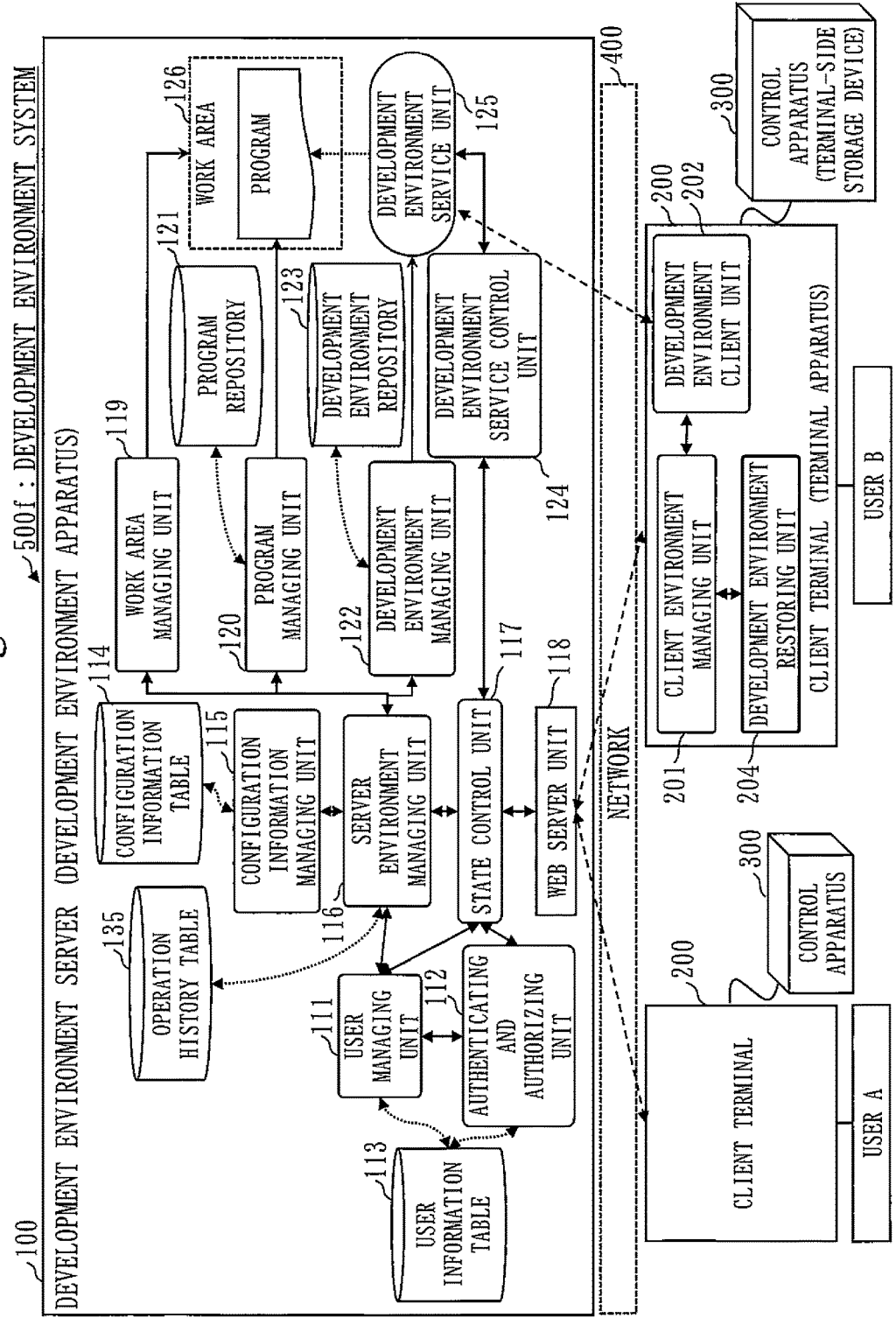
FIG. 18 is a diagram showing a block configuration of a development environment system 500f according to a seventh embodiment.

FIG. 18 is a diagram showing a block configuration of a development environment system 500f according to the present embodiment. As shown in FIG. 18, in the development environment system 500f according to the present embodiment, in addition to the configuration of the sixth embodiment, a client terminal 200 includes a development environment restoring unit 204.

When a control apparatus 300 is connected to the client terminal 200, the development environment restoring unit 204 detects the control apparatus 300. When the development environment restoring unit 204 detects the control apparatus 300, the development environment restoring unit 204 calls a server environment managing unit 116 on the development environment server 100 side. The development environment restoring unit 204 transmits a restoration request including information on a program written to the control apparatus 300, to the called server environment managing unit 116.

When the server environment managing unit 116 receives the restoration request, the server environment managing unit 116 searches an operation history table 135, etc., based on the information on a program included in the restoration request. The server environment managing unit 116 detects a development environment, the state of the program, etc., for when the writing has been performed on the control apparatus 300. The server environment managing unit 116 restores the detected development environment, state of the program, etc., on the client terminal 200 side. Basically, the development environment, etc., for the time point where the program has been written are restored, but it is also possible to restore a development environment, etc., for any time point.

As descried above, according to the development environment system 500f according to the present embodiment, an environment for the time point of program development can be automatically restored only by connecting the control apparatus 300 to the client terminal 200, and thus, maintainability and development efficiency improve.

Eighth Embodiment

The present embodiment mainly describes differences from the first to seventh embodiments.

Components having the same functions as those described in the first to seventh embodiments are denoted by the same reference signs and description thereof may be omitted.

Figure 19:
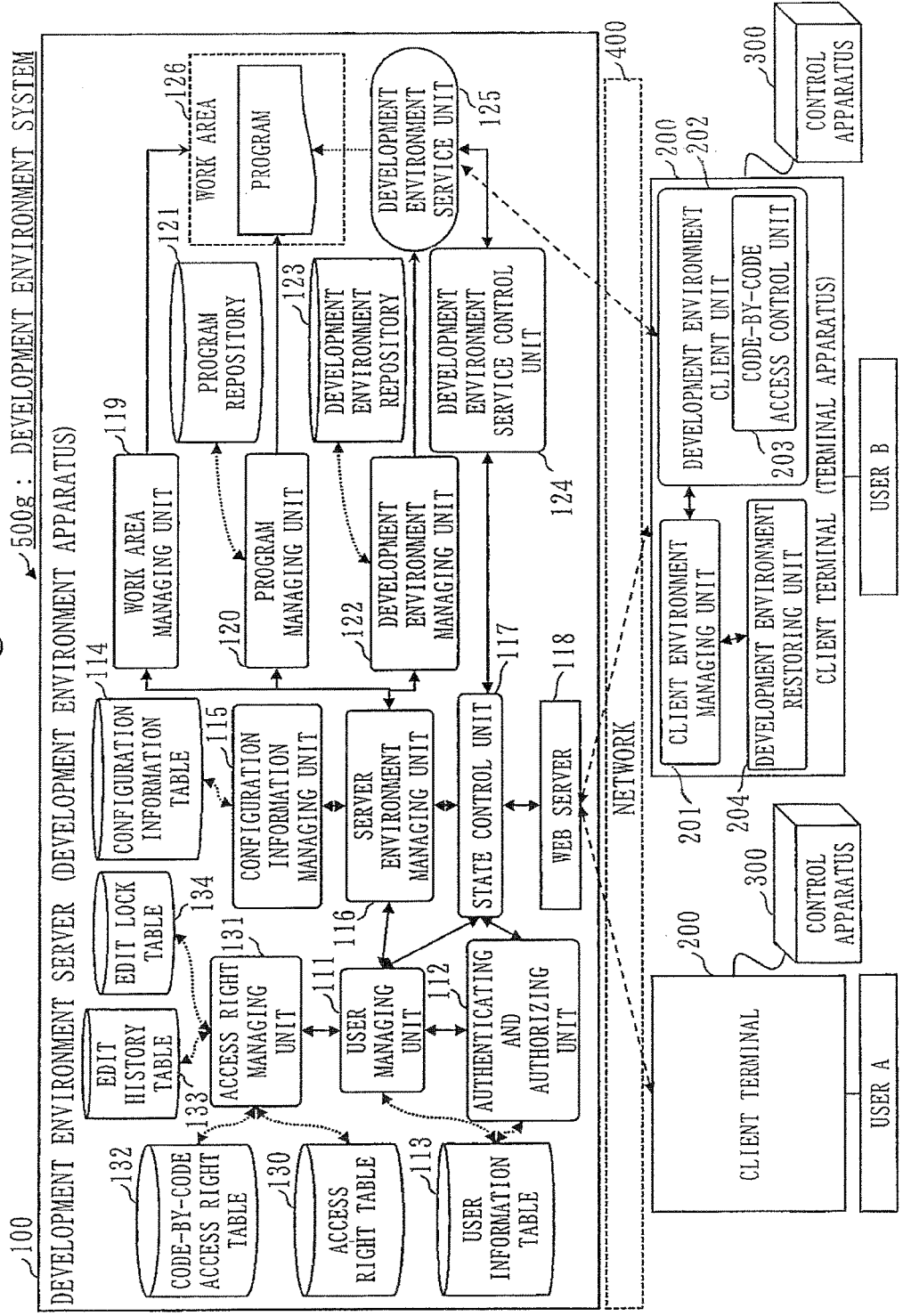
FIG. 19 is a diagram showing a block configuration of a development environment system 500g according to an eighth embodiment.

FIG. 19 is a diagram showing a block configuration of a development environment system 500g according to the present embodiment. The development environment system 500g has a configuration in which the configurations of the first to seventh embodiments are combined together.

Although the present embodiment shows the development environment system 500g having a configuration in which the configurations of the first to seventh embodiments are combined together, the development environment system 500g may be implemented by combining two or more of the embodiments together. Alternatively, one of the embodiments may be partially implemented. Alternatively, the development environment system 500g may be implemented by partially combining two or more of the embodiments together. Note that the present invention is not limited to these embodiments and various changes may be made as necessary.

The block configurations described in the above-described first to seventh embodiments are also not limited to these embodiments. For example, a "web server unit" and a "state control unit" may be configured as a single functional block and an "access right managing unit", a "configuration information managing unit", and a "user managing unit" may be configured as a single functional block. Alternatively, a development environment server 100 and a client terminal 200 may be configured by any other combination of the functional blocks described in the above-described first to seventh embodiments.

REFERENCE SIGNS LIST

100: development environment server, 111: user managing unit, 112: authenticating and authorizing unit, 113: user information table, 114: configuration information table, 115: configuration information managing unit, 116: server environment managing unit, 117: state control unit, 118: web server unit, 119: work area managing unit, 120: program managing unit, 121: program repository, 122: development environment managing unit, 123: development environment repository, 124: development environment service control unit, 125: development environment service unit, 126: work area, 130: access right table, 131: access right managing unit, 132: code-by-code access right table, 133: edit history table, 134: edit lock table, 135: operation history table, 200: client terminal, 201: client environment managing unit, 202: development environment client unit, 203: code-by-code access control unit, 204: development environment restoring unit, 300: control apparatus, 400: network, 500: development environment system, 901: computing apparatus, 902: external storage apparatus, 903: main storage apparatus, 904: communication apparatus, 905: input/output apparatus, 1141: configuration management table, 1142: program information table, 1143: development environment information table, 1144: control apparatus information table, 1301: user information access right table, and 1302: program access right table

The invention claimed is:

1. A development environment system comprising:
a terminal apparatus including a terminal-side transmitting unit that transmits an allocation request requesting to allocate a work area to be used to develop a program, and a use request requesting to use a development environment to be used to develop the program, the allocation request including user information identifying a user, and the use request including a development environment identifier identifying the development environment and the user information identifying the user; and
a development environment apparatus including:
processing circuitry:
to receive the allocation request from the terminal-side transmitting unit and allocates, by a processing apparatus, a user work area associated with the user information included in the received allocation request;
to store, in a storage apparatus, the development environment and the development environment identifier identifying the development environment in association with each other;
to receive the use request from the terminal-side transmitting unit, extract, by a processing apparatus, the development environment associated with the development environment identifier included in the received use request, from the development environment storage unit, and make the extracted development environment and the user work area available by a processing apparatus, the user work area being associated with the user information included in the use request; and
to store, in a storage apparatus, edit history information in which date and time, the user information identifying the user, the development environment identifier identifying the development environment, a program identifier identifying the program, and an edited area of the program where editing has been performed on the date and time using the development environment are associated with each other, the edit history information being information to determine whether, when the program is edited by the user, another user than the user has edited an edited area where the user attempts to perform editing.

2. The development environment system according to claim 1, wherein the terminal apparatus further includes a terminal-side developing unit that transmits a development request requesting to develop the program using the development environment and the user work area, to the development environment apparatus, the development environment and the user work area being made available by the development environment managing unit.

3. The development environment system according to claim 2, wherein
the development environment storage unit stores, as the development environment, a development program and a user interface program, the development program developing a program, and the user interface program being a user interface of the development program,
the development environment managing unit installs the development program on the development environment apparatus and transmits the user interface program to the terminal-side developing unit, and
the terminal-side developing unit receives the user interface program transmitted from the development environment managing unit, installs the received user interface program on the terminal apparatus, and executes the installed user interface program by a processing apparatus to transmit the development request.

4. The development environment system according to claim 3, wherein the development environment apparatus further includes:
processing circuitry:
to store, in a storage apparatus, the program and a program identifier identifying the program in association with each other; and
to receive, from the terminal-side transmitting unit, a development request including the program identifier identifying the program, extract, from the program storage unit, the program associated with the program identifier included in the received development request, and store the extracted program in the user work area, the development request requesting to develop the program.

5. The development environment system according to claim 4, wherein
the development environment apparatus further includes an access right storage unit that stores, in a storage apparatus, access right information in which the user information, the program identifier, and an access right of the user to the program identified by the program identifier are associated with each other, and
the program managing unit determines, by a processing apparatus, the access right of the user to the program based on the access right information stored in the access right storage unit, and extracts, when it is determined that the user has change authority to the program, the program from the program storage unit and stores the program in the user work area.

6. The development environment system according to claim 5, wherein
the development environment apparatus further includes:
processing circuitry:
to store, in a storage apparatus, code-by-code access right information in which the user information, the program identifier, a program part of the program identified by the program identifier, and a code-by-code access right of the user to the program part are associated with each other,
wherein the terminal-side developing unit includes a code-by-code access control unit that determines, by a processing apparatus, the code-by-code access right of the user to the program part based on the code-by-code access right information stored in the code-by-code access right storage unit, and performs interface control for a development process for the program, according to the determined code-by-code access right.

7. The development environment system according to claim 6, wherein
when the edited area of the program is edited by the user, the code-by-code access control unit determines, by a processing apparatus, whether another user than the user has edited the edited area of the program, based on the edit history information stored by the edit history information storage unit, and records, in the edit history information, the date and time, the user information, the development environment identifier, the program identifier, and the edited area when it is determined that the other user has not edited, and notifies the user of cancellation of the editing of the program when it is determined that the other user has edited.

8. The development environment system according to claim 7, wherein
the development environment apparatus further includes an edit lock information storage unit that stores, in a storage apparatus, edit lock information in which the program identifier identifying the program and a locked area of the program are associated with each other, and
when the program is edited by the user, the code-by-code access control unit determines, by a processing apparatus, whether an edited area of the program is locked, based on the edit lock information stored by the edit lock information storage unit, and records the program identifier and the edited area of the program in the edit lock information when it is determined that the edited area is not locked, and notifies the user of a fact that the edited area of the program is locked, when it is determined that the edited area is locked.

9. The development environment system according to claim 8, wherein
the terminal apparatus is connected to a terminal-side storage device to which the program is to be written, and
the development environment apparatus further includes an operation history information storage unit that stores, in a storage apparatus, operation history information in which operation date and time when the user has performed an operation on the terminal-side storage device, the user information identifying the user, the development environment identifier identifying the development environment, the program identifier identifying the program, a terminal-side storage device identifier identifying the terminal-side storage device on which the operation has been performed on the operation date and time, and content of the operation are associated with each other.

10. The development environment system according to claim 9, wherein
the terminal apparatus further includes a development environment restoring unit that transmits a restoration request including information on the program stored in the terminal-side storage device, to the development environment apparatus, the restoration request requesting to restore the development environment and a state of the program for a time point where the program has been developed, and
the development environment apparatus further receives the restoration request from the development environment restoring unit and searches the operation history information stored in the operation history information storage unit, based on the information on the program included in the received restoration request, to restore the development environment and a state of the program for the time point where the program has been developed.

11. A development environment apparatus comprising:
processing circuitry:
to receive, from a terminal apparatus that transmits an allocation request and a use request, the allocation request, and allocate a user work area, the allocation request requesting to allocate a work area to be used to develop a program and including user information identifying a user, the use request requesting to use a development environment to be used to develop the program and including a development environment identifier identifying the development environment and the user information identifying the user, and the user work area being associated with the user information included in the received allocation request;
to store, in a storage apparatus, the development environment and the development environment identifier identifying the development environment in association with each other;
to receive the use request from the terminal apparatus, extract, from the development environment storage unit, the development environment associated with the development environment identifier included in the received use request, and make the extracted development environment and the user work area available, the user work area being associated with the user information included in the use request; and
to store, in a storage apparatus, edit history information in which date and time, the user information identifying the user, the development environment identifier identifying the development environment, a program identifier identifying the program, and an edited area of the program where editing has been performed on the date and time using the development environment are associated with each other, the edit history information being information to determine whether, when the program is edited by the user, another user than the user has edited an edited area where the user attempts to perform editing.

12. A development environment providing method comprising:
transmitting, from a terminal apparatus, an allocation request requesting to allocate a work area to be used to develop a program, and a use request requesting to use a development environment to be used to develop the program, the allocation request including user information identifying a user, and the use request including a development environment identifier identifying the development environment and the user information identifying the user;
receiving the allocation request from the terminal apparatus and allocating a user work area associated with the user information included in the received allocation request;
receiving the use request from the terminal apparatus, extracting, from a development environment storage unit, the development environment associated with the development environment identifier included in the received use request, and making the extracted development environment and the user work area available, the development environment storage unit storing, in a storage apparatus, the development environment and the development environment identifier identifying the development environment in association with each other, and the user work area being associated with the user information included in the use request; and
storing, in a storage apparatus, edit history information in which date and time, the user information identifying the user, the development environment identifier identifying the development environment, a program identifier identifying the program, and an edited area of the program where editing has been performed on the date and time using the development environment are associated with each other, the edit history information being information to determine whether, when the program is edited by the user, another user than the user has edited an edited area where the user attempts to perform editing.

13. A non-transitory computer readable medium storing a program causing a computer to perform:
an allocation process of receiving, from a terminal apparatus that transmits an allocation request and a use request, the allocation request and allocating a user work area, the allocation request requesting to allocate a work area to be used to develop a program and including user information identifying a user, the use request requesting to use a development environment to be used to develop the program and including a development environment identifier identifying the development environment and the user information identifying the user, and the user work area being associated with the user information included in the received allocation request;
a development environment process of receiving the use request from the terminal apparatus, extracting, from a development environment storage unit, the development environment associated with the development environment identifier included in the received use request, and making the extracted development environment and the user work area available, the development environment storage unit storing, in a storage apparatus, the development environment and the development environment identifier identifying the development environment in association with each other, and the user work area being associated with the user information included in the use request; and
an edit history information storing process of storing, in a storage apparatus, edit history information in which date and time, the user information identifying the user, the development environment identifier identifying the development environment, a program identifier identifying the program, and an edited area of the program where editing has been performed on the date and time using the development environment are associated with each other, the edit history information being information to determine whether, when the program is edited by the user, another user than the user has edited an edited area where the user attempts to perform editing.

* * * * *